(12) United States Patent
Bleyer et al.

(10) Patent No.: US 11,037,359 B1
(45) Date of Patent: Jun. 15, 2021

(54) REAL-TIME RENDERING STYLIZED PASSTHROUGH IMAGES

(71) Applicant: Microsoft Technology Licensing, LLC, Redmond, WA (US)

(72) Inventors: Michael Bleyer, Seattle, WA (US); Christopher Douglas Edmonds, Carnation, WA (US); Raymond Kirk Price, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/910,263

(22) Filed: Jun. 24, 2020

(51) Int. Cl.
*G06T 15/04* (2011.01)
*G06T 7/593* (2017.01)
*G06T 15/80* (2011.01)
*G06T 19/00* (2011.01)

(52) U.S. Cl.
CPC .............. *G06T 15/04* (2013.01); *G06T 7/593* (2017.01); *G06T 15/80* (2013.01); *G06T 19/006* (2013.01); *G06T 2207/10028* (2013.01)

(58) Field of Classification Search
None
See application file for complete search history.

(56) References Cited

U.S. PATENT DOCUMENTS

2008/0084472 A1\* 4/2008 Trudeau ............... G02B 27/017
348/51

\* cited by examiner

*Primary Examiner* — Frank S Chen
(74) *Attorney, Agent, or Firm* — Workman Nydegger

(57) ABSTRACT

Improved techniques for providing passthrough images in the form of a stylized image embodying a novel perspective. A raw texture image of an environment is generated. A depth map is acquired for the environment. A stylized image is generated by applying a stylization filter to the raw texture image. Subsequent to acquiring the depth map and subsequent to generating the stylized image, a stylized parallax-corrected image is generated by reprojecting the stylized image to a new perspective using depth data.

20 Claims, 16 Drawing Sheets

Parallax Problem
100

Stereoscopic Consistency
1185

Stylization Consistency
1190

*Figure 11B*

REAL-TIME RENDERING STYLIZED PASSTHROUGH IMAGES

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

Many MR systems include a depth detection system (e.g., time of flight camera, rangefinder, stereoscopic depth cameras, etc.). A depth detection system provides depth information about the real-world environment surrounding the MR system to enable the MR system to accurately present MR content (e.g., holograms) with respect to real-world objects or other virtual objects. As an illustrative example, a depth detection system is able to obtain depth information for a real-world table positioned within a real-world environment. The MR system is then able to render and display a virtual figurine accurately positioned on the real-world table such that the user perceives the virtual figurine as though it were part of the user's real-world environment.

A MR system may also employ cameras of a depth detection system, such as stereo cameras, for other purposes. For example, a MR system may utilize images obtained by stereo cameras to provide a passthrough view of the user's environment to the user. A passthrough view can aid users in avoiding disorientation and/or safety hazards when transitioning into and/or navigating within a MR environment.

Furthermore, in some instances, a MR system includes stereo cameras of various modalities to provide views of a user's environment that enhance the user's understanding of his/her real-world environment. For example, a MR system that includes long wavelength thermal imaging cameras may allow a user (e.g., a first responder) to see through smoke, haze, fog, and/or dust. In another example, a MR system that includes low light imaging cameras may allow a user (e.g., a first responder) to see in dark environments.

A MR system can present views captured by stereo cameras to users in a variety of ways. The process of using images captured by world-facing cameras to provide three-dimensional views of a real-world environment to a user creates many challenges, however.

Some of these challenges occur as a result of the stereo cameras being physically separated from the physical positioning of the user's eyes. If the camera's images were directly provided to the user as passthrough images, those images would cause the user to perceive the real-world environment from the camera's perspective as opposed to the user's own perspective. For example, a vertical offset between the positioning of the user's eyes and the positioning of the stereo cameras can cause the user to perceive real-world objects as vertically offset from their true positions with respect to the user. In another example, a difference in the spacing between the user's eyes and the spacing between the stereo cameras can cause the user to perceive real-world objects with incorrect depth.

The difference in perception between how the cameras observe an object and how a user's eyes observe an object is often referred to as the "parallax problem" or "parallax error." FIG. 1 illustrates a conceptual representation of the parallax problem 100 in which cameras 105A and 105B (i.e. a stereo pair of camera) are physically separated from a user's eyes 110A and 110B. Sensor region 115A conceptually depicts the image sensing regions of camera 105A (e.g., the pixel grid) and the user's eye 110A (e.g., the retina). Similarly, sensor region 115B conceptually depicts the image sensing regions of camera 105B and the user's eye 110B.

The cameras 105A and 105B and the user's eyes 110A and 110B perceive an object 120, as indicated in FIG. 1 by the lines extending from the object 120 to the cameras 105A and 105B and the user's eyes 110A and 110B, respectively. FIG. 1, for example, illustrates that the cameras 105A and 105B perceive the object 120 at different positions on their respective sensor regions 115A and 115B. Similarly, FIG. 1 shows that the user's eyes 110A and 110B perceive the object 120 at different positions on their respective sensor regions 115A and 115B. Furthermore, the user's eye 110A perceives the object 120 at a different position on sensor region 115A than camera 105A, and the user's eye 110B perceives the object 120 at a different position on sensor region 115B than camera 105B.

Some approaches to correct for the parallax problem involve performing a camera reprojection from the perspective of the stereo cameras to the perspectives of the user's eyes. For instance, some approaches involve performing a calibration step to determine the differences in physical positioning between the stereo cameras and the user's eyes. Then, after capturing a timestamped pair of stereo images with the stereo cameras, a step of calculating depth information (e.g., a depth map) based on the stereo pair of images can be performed (e.g., by performing stereo matching). Subsequently, a system can reproject the stereo images using the calculated depth information so that perspectives embodied within those stereo images correspond to the perspectives of the user's left and right eyes.

Although passthrough visualizations provide substantial benefits, there are still many aspects of generating the passthrough visualizations that can be improved. Furthermore, there are other applications and scenarios in which passthrough visualizations may be utilized, including new areas of computer vision scenarios. Accordingly, there are still many aspects that can be improved.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods that are configured to provide improved passthrough images in the form of a stylized parallax-corrected image.

In some embodiments, a raw texture image of an environment is generated using a camera. A depth map is also acquired, where this depth map includes three-dimensional (3D) data of the environment. A stylized image is also generated by applying one or more stylization filters to at least a portion of the raw texture image. Subsequent to acquiring the depth map and subsequent to generating the stylized image, the embodiments generate a stylized parallax-corrected image. This stylized parallax-corrected image is generated by reprojecting texture information from the stylized image to correspond to a novel perspective. This reprojection process is performed using one of the depth map or, alternatively, a different depth map associated with a different raw texture image captured by the camera.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIGS. 11A and 11B illustrate various features of a flowchart that generally describes some of the disclosed principles.

DETAILED DESCRIPTION

Embodiments disclosed herein relate to systems, devices (e.g., wearable devices, hardware storage devices, etc.), and methods that are configured to provide improved passthrough images in the form of a stylized parallax-corrected image.

In some embodiments, a raw texture image of an environment is generated. A depth map is acquired for the environment. A stylized image is generated by applying a stylization filter to the raw texture image. Subsequent to acquiring the depth map and subsequent to generating the stylized image, a stylized parallax-corrected image is generated by reprojecting the stylized image to a new perspective using depth data.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide substantial benefits to the technical field of passthrough visualization and parallax correction. Specifically, the disclosed principles enable the application of any number or type of different stylization effects to be applied to an image. Notably, these stylization effects are applied before parallax correction is performed. Furthermore, these stylization effects may, in some cases, be performed during an overlapping time period with when a depth map is generated. To clarify, the depth map is generated, in some cases, simultaneously with the application of stylization effects.

What this means is that the depth map is generated not based on the stylized image, but rather on depth data from a different source, such as the original raw texture image or another source. The embodiments are able to beneficially perform the depth map generation process and the stylization process in parallel, thereby enabling streamlined operations in the flow or pipeline. Furthermore, because the stylizations are bounded, the application of the stylizations does not cause any new 3D data to be added, meaning that even though the depth map is not generated based on the stylized image, that depth map can still be used to perform the parallax correction on the stylized image because modifications to the stylized image do not result in the addition of any new 3D data. Accordingly, the embodiments provide substantial benefits to the technical field by enabling stylization effects to be applied to images and by enabling a depth map to be used for parallax correction even though that depth map is not generated based on the stylized image.

Example MR Systems and HMDs

Figure 1:
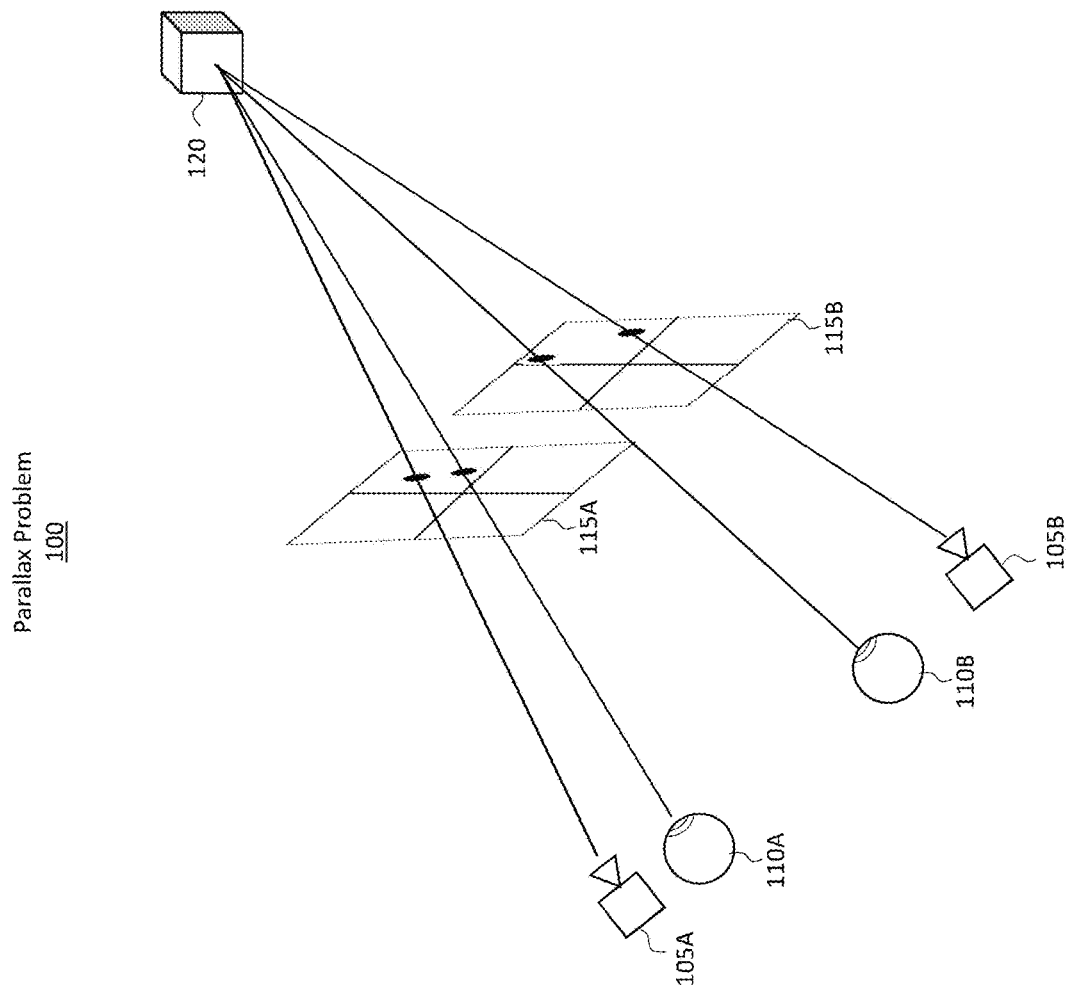
FIG. 1 illustrates an example of the parallax problem that occurs when cameras have fields of view different than the fields of view of a user's eyes.
Figure 2:
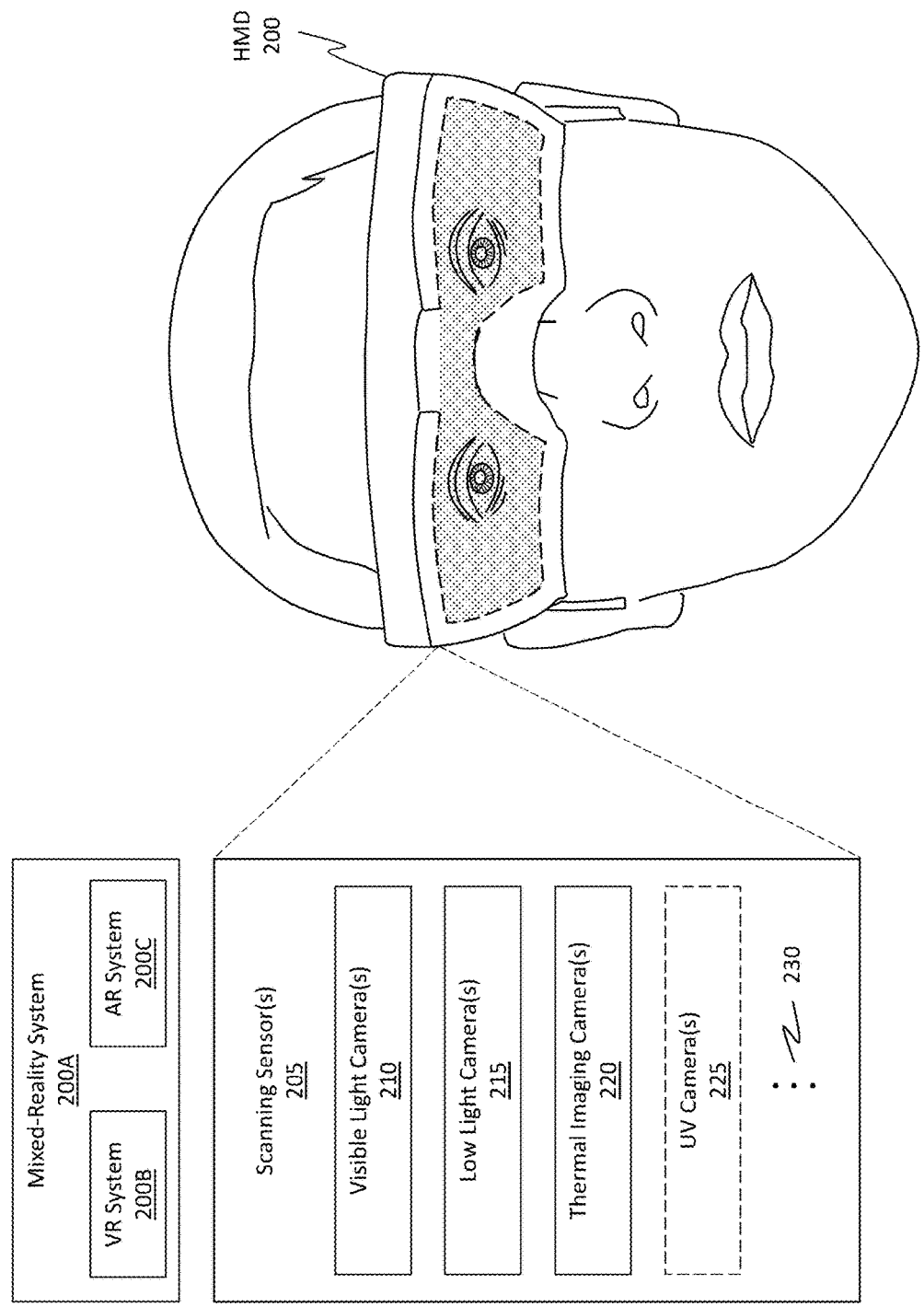
FIG. 2 illustrates an example HMD that may be used to perform one or more of the disclosed operations.

Attention will now be directed to FIG. 2, which illustrates an example of a head-mounted device (HMD) 200. HMD 200 can be any type of MR system 200A, including a VR system 200B or an AR system 200C. It should be noted that while a substantial portion of this disclosure is focused on the use of an HMD, the embodiments are not limited to being practiced using only an HMD. That is, any type of scanning system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 200 is shown as including scanning sensor(s) 205 (i.e. a type of scanning or camera system), and HMD 200 can use the scanning sensor(s) 205 to scan environments, map environments, capture environmental data, and/or generate any kind of images of the environment (e.g., by generating a 3D representation of the environment or by generating a "passthrough" visualization). Scanning sensor(s) 205 may comprise any number or any type of scanning devices, without limit.

In accordance with the disclosed embodiments, the HMD 200 may be used to generate a parallax-corrected passthrough visualization of the user's environment. As described earlier, in some cases, a "passthrough" visualization refers to a visualization that reflects what the user would see if the user were not wearing the HMD 200, regardless of whether the HMD 200 is included as a part of an AR system or a VR system. In other cases, the passthrough visualization reflects a different or novel perspective.

To generate this passthrough visualization, the HMD 200 may use its scanning sensor(s) 205 to scan, map, or otherwise record its surrounding environment, including any objects in the environment, and to pass that data on to the user to view. In many cases, the passed-through data is modified to reflect or to correspond to a perspective of the user's pupils, though other perspectives may be reflected by the image as well. The perspective may be determined by any type of eye tracking technique or other data.

To convert a raw image into a passthrough image, the scanning sensor(s) 205 typically rely on its cameras (e.g., head tracking cameras, hand tracking cameras, depth cameras, or any other type of camera) to obtain one or more raw images (aka texture images) of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections.

As used herein, a "depth map" details the positional relationship and depths relative to objects in the environment. Consequently, the positional arrangement, location, geometries, contours, and depths of objects relative to one another can be determined. From the depth maps, a 3D representation of the environment can be generated.

Relatedly, from the passthrough visualizations, a user will be able to perceive what is currently in his/her environment without having to remove or reposition the HMD 200. Furthermore, as will be described in more detail later, the disclosed passthrough visualizations will also enhance the user's ability to view objects within his/her environment (e.g., by displaying additional environmental conditions that may not have been detectable by a human eye).

It should be noted that while the majority of this disclosure focuses on generating "a" passthrough image, the embodiments may generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 205 include visible light camera(s) 210, low light camera(s) 215, thermal imaging camera(s) 220, potentially (though not necessarily, as represented by the dotted box in FIG. 2) ultraviolet (UV) camera(s) 225, and potentially (though not necessarily) a dot illuminator (not shown). The ellipsis 230 demonstrates how any other type of camera or camera system (e.g., depth cameras, time of flight cameras, virtual cameras, depth lasers, etc.) may be included among the scanning sensor(s) 205.

As an example, a camera structured to detect mid-infrared wavelengths may be included within the scanning sensor(s) 205. As another example, any number of virtual cameras that are reprojected from an actual camera may be included among the scanning sensor(s) 205 and may be used to generate a stereo pair of images. In this manner and as will be discussed in more detail later, the scanning sensor(s) 205 may be used to generate the stereo pair of images. In some cases, the stereo pair of images may be obtained or generated as a result of performing any one or more of the following operations: active stereo image generation via use of two cameras and one dot illuminator; passive stereo image generation via use of two cameras; image generation using structured light via use of one actual camera, one virtual camera, and one dot illuminator; or image generation using a time of flight (TOF) sensor in which a baseline is present between a depth laser and a corresponding camera and in which a field of view (FOV) of the corresponding camera is offset relative to a field of illumination of the depth laser.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 210 include two or more red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras are typically stereoscopic cameras, meaning that the fields of view of the two or more RGB cameras at least partially overlap with one another. With this overlapping region, images generated by the visible light camera(s) 210 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 210 can be used to not only generate passthrough visualizations, but they can also be used to determine object depth. In some embodiments, the visible light camera(s) 210 can capture both visible light and IR light.

The low light camera(s) 215 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 215 are structured to detect or be sensitive to IR light in at least the near-IR range.

In some embodiments, the visible light camera(s) 210 and the low light camera(s) 215 (aka low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 210 are low power cameras and operate in environments where the illuminance is between about a dusk illuminance (e.g., about 10 lux) and a bright noonday sun illuminance (e.g., about 100,000 lux), or rather, the illuminance range begins at about 10 lux and increases beyond 10 lux. In contrast, the low light camera(s) 215 consume more power and operate in environments where the illuminance range is between about a starlight illumination (e.g., about 1 milli lux) and a dusk illumination (e.g., about 10 lux).

The thermal imaging camera(s) 220, on the other hand, are structured to detect electromagnetic radiation or IR light in the far-IR (i.e. thermal-IR) range, though some embodiments also enable the thermal imaging camera(s) 220 to detect radiation in the mid-IR range. To clarify, the thermal imaging camera(s) 220 may be a long wave infrared imaging camera structured to detect electromagnetic radiation by measuring long wave infrared wavelengths. Often, the thermal imaging camera(s) 220 detect IR radiation having wavelengths between about 8 microns and 14 microns to detect blackbody radiation from the environment and people in the camera field of view. Because the thermal imaging camera(s) 220 detect far-IR radiation, the thermal imaging camera(s) 220 can operate in any illuminance condition, without restriction.

In some cases (though not all), the thermal imaging camera(s) 220 include an uncooled thermal imaging sensor. An uncooled thermal imaging sensor uses a specific type of detector design that is based on an array of microbolometers, which is a device that measures the magnitude or power of an incident electromagnetic wave/radiation. To measure the radiation, the microbolometer uses a thin layer of absorptive material (e.g., metal) connected to a thermal reservoir through a thermal link. The incident wave strikes and heats the material. In response to the material being heated, the microbolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 225 are structured to capture light in the UV range. The UV range includes electromagnetic radiation having wavelengths between about 150 nm and about 400 nm. The disclosed UV camera(s) 225 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 μm in size. Low light cameras, on the other hand, are cameras that are sensitive to visible light and near-IR. These cameras are larger and may have pixels that are about 8 μm in size or larger. These cameras are also sensitive to wavelengths that silicon sensors are sensitive to, which wavelengths are between about 350 nm to 1100 nm. These sensors can also be fabricated with III-V materials to be optically sensitive to NIR wavelengths. Thermal/long wavelength IR devices (i.e. thermal imaging cameras) have pixel sizes that are about 10 μm or larger and detect heat radiated from the environment. These cameras are sensitive to wavelengths in the 8 μm to 14 μm range. Some embodiments also include mid-IR cameras configured to detect at least mid-IR light. These cameras often comprise non-silicon materials (e.g., InP or InGaAs) that detect light in the 800 nm to 2 μm wavelength range.

Accordingly, the disclosed embodiments may be structured to utilize numerous different camera types. The different camera types include, but are not limited to, visible light cameras, low light cameras, thermal imaging cameras, and UV cameras. Stereo depth matching may be performed using images generated from any one type or combination of types of the above listed camera types.

Generally, the low light camera(s) 215, the thermal imaging camera(s) 220, and the UV camera(s) 225 (if present) consume relatively more power than the visible light camera(s) 210. Therefore, when not in use, the low light camera(s) 215, the thermal imaging camera(s) 220, and the UV camera(s) 225 are typically in the powered-down state in which those cameras are either turned off (and thus consuming no power) or in a reduced operability mode (and thus consuming substantially less power than if those cameras were fully operational). In contrast, the visible light camera(s) 210 are typically in the powered-up state in which those cameras are by default fully operational.

It should be noted that any number of cameras may be provided on the HMD 200 for each of the different camera types. That is, the visible light camera(s) 210 may include 1, 2, 3, 4, 5, 6, 7, 8, 9, 10, or more than 10 cameras. Often, however, the number of cameras is at least 2 so the HMD 200 can perform stereoscopic depth matching, as described earlier. Similarly, the low light camera(s) 215, the thermal imaging camera(s) 220, and the UV camera(s) 225 may each respectively include 1, 2, 3, 4, 5, 6, 7, 8, 9, 10, or more than 10 corresponding cameras.

Figure 3:
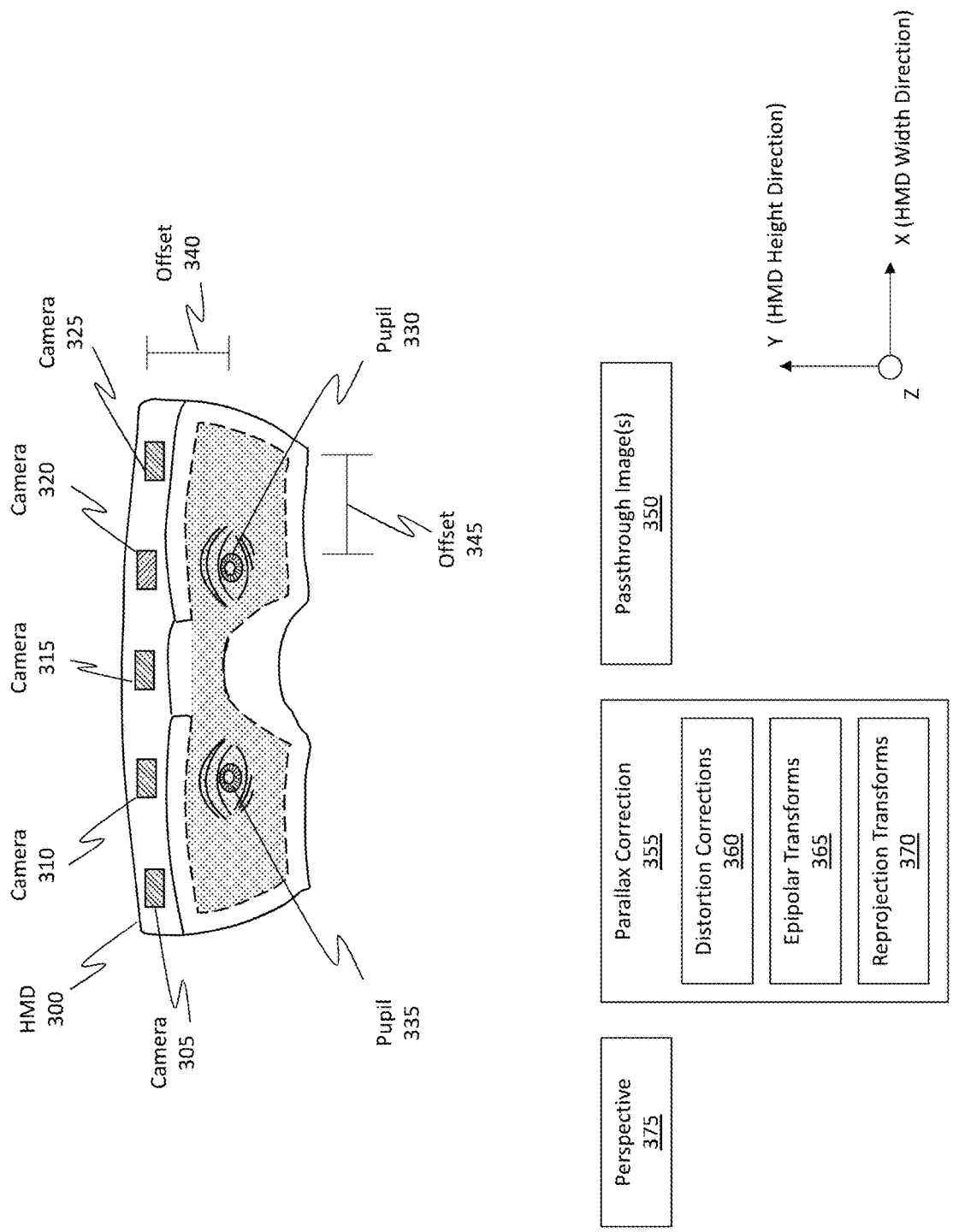
FIG. 3 illustrates various structural configurations of an example HMD as well as a parallax correction operation.

FIG. 3 illustrates an example HMD 300, which is representative of the HMD 200 from FIG. 2. HMD 300 is shown as including multiple different cameras, including cameras 305, 310, 315, 320, and 325. Cameras 305-325 are representative of any number or combination of the visible light camera(s) 210, the low light camera(s) 215, the thermal imaging camera(s) 220, and the UV camera(s) 225 from FIG. 2. While only 5 cameras are illustrated in FIG. 3, HMD 300 may include more or less than 5 cameras.

In some cases, the cameras can be located at specific positions on the HMD 300. For instance, in some cases a first camera (e.g., perhaps camera 320) is disposed on the HMD 300 at a position above a designated left eye position of any users who wear the HMD 300 relative to a height direction of the HMD. For instance, the camera 320 is positioned above the pupil 330. As another example, the first camera (e.g., camera 320) is additionally positioned above the designated left eye position relative to a width direction of the HMD. That is, the camera 320 is positioned not only above the pupil 330 but also in-line relative to the pupil 330. When a VR system is used, a camera may be placed directly in front of the designated left eye position. For example, with reference to FIG. 3, a camera may be physically disposed on the HMD 300 at a position in front of the pupil 330 in the z-axis direction.

When a second camera is provided (e.g., perhaps camera 310), the second camera may be disposed on the HMD at a position above a designated right eye position of any users who wear the HMD relative to the height direction of the HMD. For instance, the camera 310 is above the pupil 335. In some cases, the second camera is additionally positioned above the designated right eye position relative to the width direction of the HMD. When a VR system is used, a camera may be placed directly in front of the designated right eye position. For example, with reference to FIG. 3, a camera may be physically disposed on the HMD 300 at a position in front of the pupil 335 in the z-axis direction.

When a user wears HMD 300, HMD 300 fits over the user's head and the HMD 300's display is positioned in front of the user's pupils, such as pupil 330 and pupil 335. Often, the cameras 305-325 will be physically offset some distance from the user's pupils 330 and 335. For instance, there may be a vertical offset in the HMD height direction (i.e. the "Y" axis), as shown by offset 340. Similarly, there may be a horizontal offset in the HMD width direction (i.e. the "X" axis), as shown by offset 345.

As described earlier, HMD 300 is configured to provide passthrough image(s) 350 for the user of HMD 300 to view. In doing so, HMD 300 is able to provide a visualization of the real world without requiring the user to remove or reposition HMD 300. These passthrough image(s) 350 effectively represent the same view the user would see if the user were not wearing HMD 300. Cameras 305-325 are used to provide these passthrough image(s) 350.

None of the cameras 305-325, however, are telecentrically aligned with the pupils 330 and 335. The offsets 340 and 345 actually introduce differences in perspective as between the cameras 305-325 and the pupils 330 and 335. These perspective differences are referred to as "parallax."

Because of the parallax occurring as a result of the offsets 340 and 345, raw images (aka texture images) produced by the cameras 305-325 are not available for immediate use as passthrough image(s) 350. Instead, it is beneficial to perform a parallax correction 355 (aka an image synthesis) on the raw images to transform the perspectives embodied within those raw images to correspond to perspectives of the user's pupils 330 and 335. The parallax correction 355 includes any number of distortion corrections 360 (e.g., to correct for concave or convex wide or narrow angled camera lenses), epipolar transforms 365 (e.g., to parallelize the optical axes of the cameras), and/or reprojection transforms 370 (e.g., to reposition the optical axes so as to be essentially in front of or in-line with the user's pupils). The parallax correction 355 includes performing depth computations to determine the depth of the environment and then reprojecting images to a determined location or as having a determined perspective. As used herein, the phrases "parallax correction" and "image synthesis" may be interchanged with one another and may include performing stereo passthrough parallax correction and/or image reprojection parallax correction.

The reprojections are based on a current perspective 375 of the HMD 300 relative to its surrounding environment. Based on the perspective 375 and the depth maps that are generated, the embodiments are able to correct parallax by reprojecting a perspective embodied by the raw images to coincide with a perspective of the user's pupils 330 and 335.

The embodiments perform three-dimensional (3D) geometric transforms on the raw camera images to transform the perspectives of the raw images in a manner so as to correlate with the perspectives of the user's pupils 330 and 335. Additionally, the 3D geometric transforms rely on depth computations in which the objects in the HMD 300's environment are mapped out to determine their depths as well as the perspective 375. Based on these depth computations and perspective 375, the embodiments are able to three-dimensionally reproject or three-dimensionally warp the raw images in such a way so as to preserve the appearance of object depth in the passthrough image(s) 350, where the preserved object depth substantially matches, corresponds, or visualizes the actual depths of objects in the real world. Accordingly, the degree or amount of the parallax correction 355 is at least partially dependent on the degree or amount of the offsets 340 and 345.

By performing the parallax correction 355, the embodiments effectively create "virtual" cameras having positions that are in front of the user's pupils 330 and 335. By way of additional clarification, consider the position of camera 305, which is currently above and to the left of the pupil 335. By performing the parallax correction 355, the embodiments programmatically transform images generated by camera 305, or rather the perspectives of those images, so the perspectives appear as though camera 305 were actually positioned immediately in front of pupil 335. That is, even though camera 305 does not actually move, the embodiments are able to transform images generated by camera 305 so those images have the appearance as if camera 305 were positioned in front of pupil 335.

Texture Images

Figure 4:
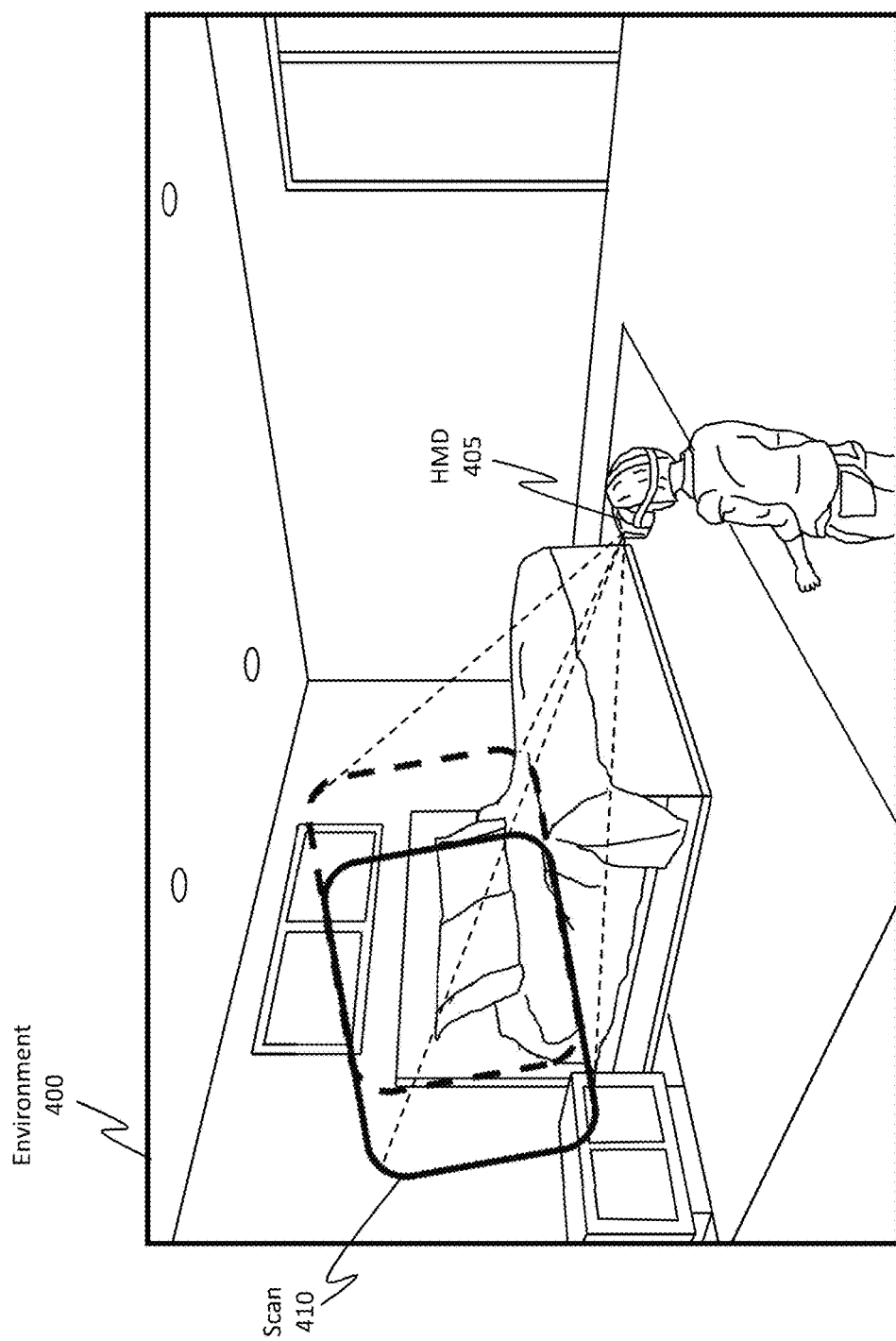
FIG. 4 illustrates an example process of scanning an environment using a stereo camera pair to obtain stereo images of the environment.

FIG. 4 shows an example environment 400 in which an HMD 405, which is representative of the HMDs discussed thus far, is operating. Here, the HMD 405 is performing a scan 410 of the environment 400 in an effort to identify depths of the objects included therein, as described earlier. Determining the depths can be performed using stereo depth matching, which is based on the disparity between common pixels that exist between two different stereo images, or any other depth determining methodology (e.g., range finding).

Figure 5:
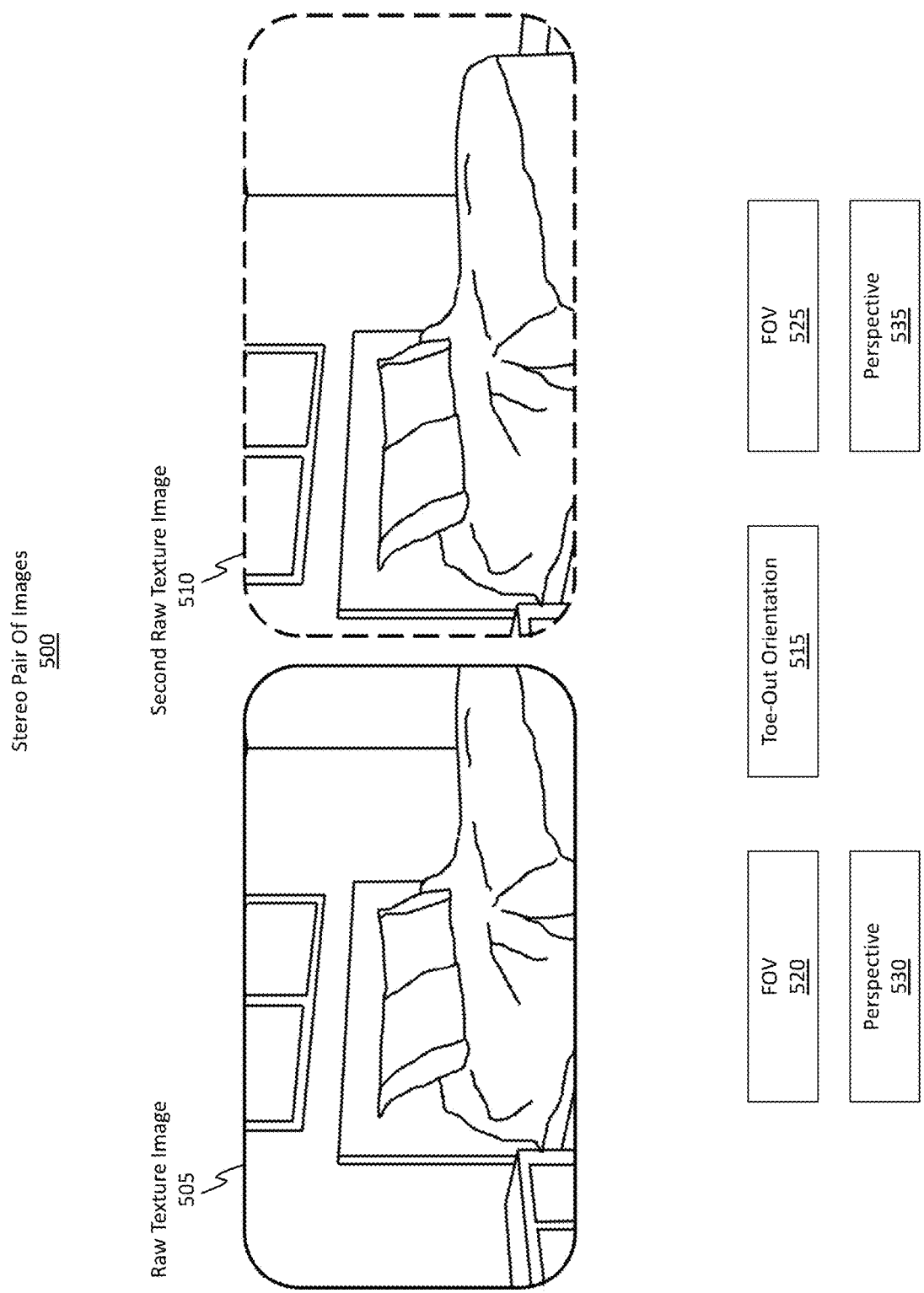
FIG. 5 illustrates an example of a stereo pair of images.

FIG. 5 shows a stereo pair of images 500, which includes a raw texture image 505 and a second raw texture image 510. The stereo pair of images 500 may have been generated using any of the cameras discussed earlier. By way of example, the raw texture image 505 is generated by a first camera and the second raw texture image 510 is generated by a second camera. The first camera is one camera selected from a group of cameras comprising a visible light camera, a low light camera, or a thermal imaging camera. Similarly, the second camera is also one camera selected from the group of cameras. In some cases, the first and second camera are the same while in other cases they are different.

Because those cameras have a physical toe-out orientation 515 relative to one another (i.e. their optical axes are angled relative to one another), the fields of view (FOVs) of the resulting images only partially overlap one another. For instance, the FOV 520 of the raw texture image 505 only partially overlaps the FOV 525 of the second raw texture image 510. Additionally, because the cameras are positioned at different locations on the HMD, the perspective 530 of the environment, as captured by the raw texture image 505, is different from the perspective 535 of the environment, as captured by the second raw texture image 510.

Depth Data

Figure 6:
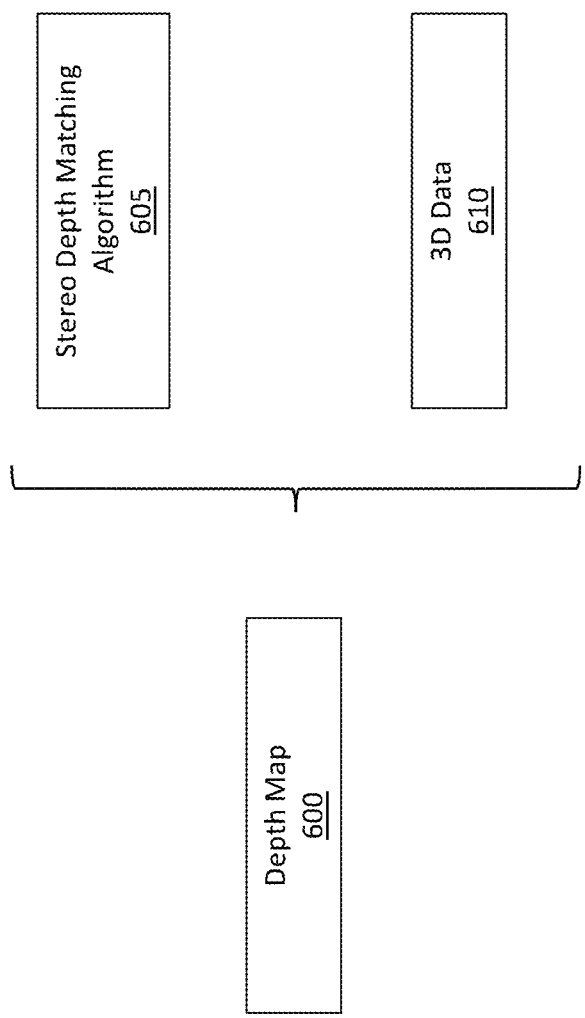
FIG. 6 illustrates how a depth map may be generated based on different sets of data.

FIG. 6 illustrates how the embodiments are able to utilize a depth map 600 to perform the reprojections involved in the parallax correction. In some cases, the depth map 600 is generating using a stereo depth matching algorithm 605 that performs stereo depth matching on the raw texture image 505 and the second raw texture image 510 from FIG. 5. Specifically, the stereo depth matching algorithm 605 identifies pixel disparities between the common or overlapping regions of the raw texture image 505 and the second raw texture image 510 in order to derive the depth map 600.

In some embodiments, the depth map 600 is generated independently of any information included in either one of the raw texture image 505 or the second raw texture image 510 from FIG. 5. Instead, the depth map 600 may be generated using 3D data 610 obtained from another source. Examples of this source for the 3D data 610 include, but are not limited to, a different picture/video PV camera, a time-of-flight depth camera, or any other type of range finder. Regardless of the type of the source, that source is able to generate the 3D data 610 independently of the raw texture images 505 and 510 from FIG. 5. Furthermore, regardless of how the depth map 600 is generated, the embodiments are able to perform parallax correction using the depth map 600. Further details on these features will be provided later.

Image Stylization

Figure 7:
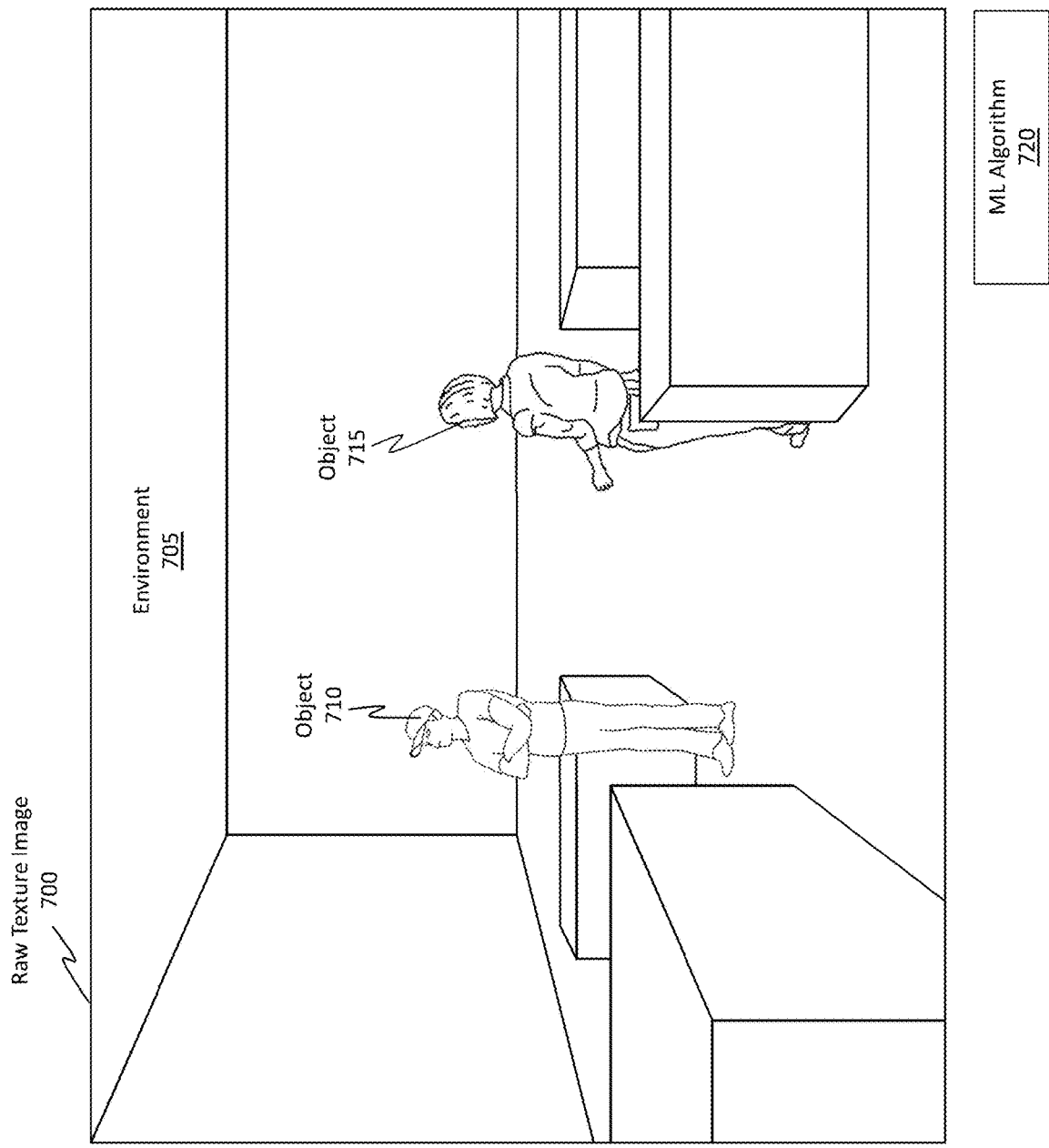
FIG. 7 illustrates another example of a raw texture image.

FIG. 7 shows an example raw texture image 700, which is representative of either one of the raw texture images 505 and 510 from FIG. 5. Raw texture image 700 currently reflects or illustrates some objects included within the environment 705. For instance, raw texture image 700 visualizes object 710 (i.e. a man in a cap) and object 715 (i.e. a woman). The different objects in the raw texture image 700, including objects 710 and 715, may be identified via any type of image segmentation or recognition operation. For instance, a machine learning ML algorithm 720 can be used to examine the pixels of the raw texture image 700 to identify and classify different types of objects (e.g., a human type, a countertop type, a wall type, and so on). The pixels for each object may be identified, or segmented, and grouped together so they can be identified as corresponding to a particular object.

Any type of ML algorithm, model, or machine learning may be used as the ML algorithm 720. As used herein, reference to "machine learning" or to a ML model may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

Figure 8:
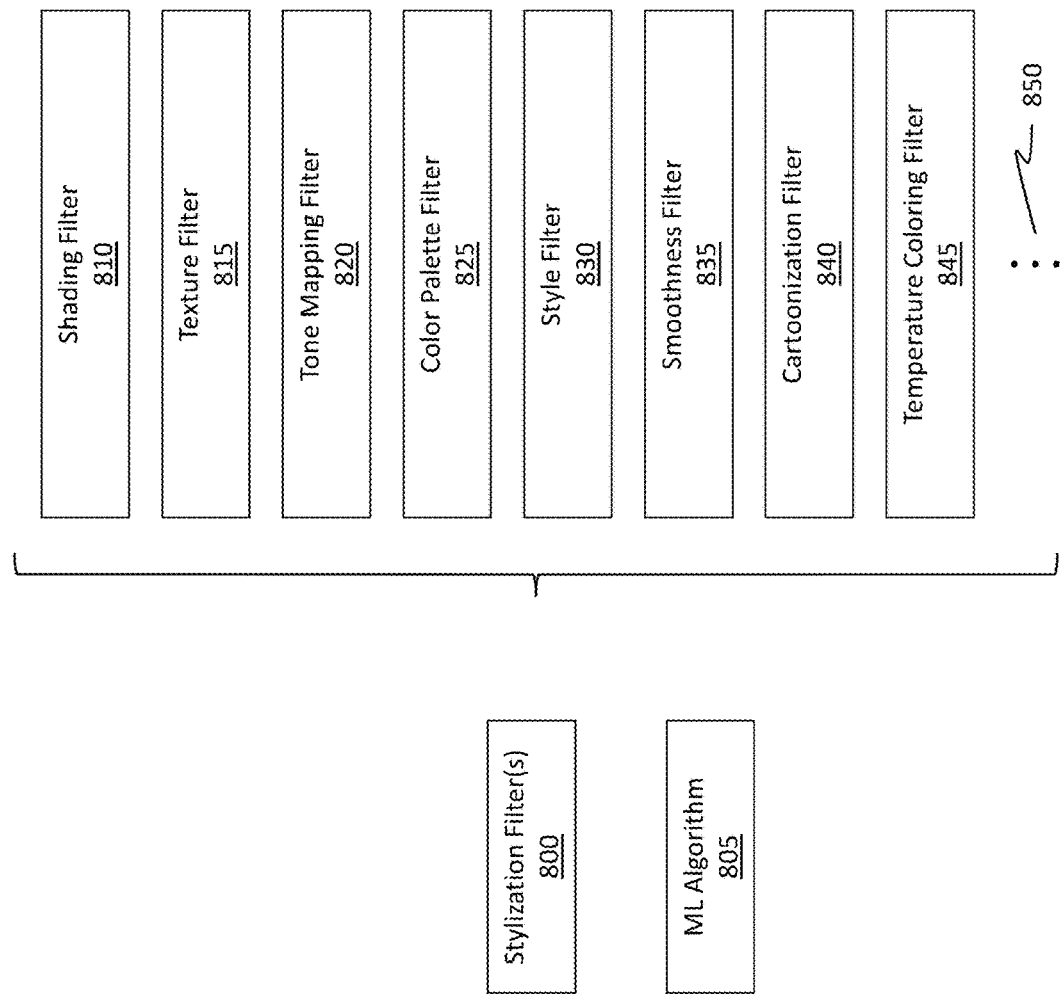
FIG. 8 illustrates how different stylization filters can be applied to a raw texture image to add stylization to the image.

Once the objects in the raw texture image 700 are identified, the embodiments are able to selectively apply one or more stylization filters to at least a portion of the raw texture image. FIG. 8 shows an example stylization filter(s) 800 that may be applied to the objects in the raw texture image. In some cases, a ML algorithm 805, which may be representative of the ML algorithm 720 of FIG. 7, may selectively apply the stylization filter(s) 800.

The stylization filter(s) 800 include, but are not limited the following: a shading filter 810, a texture filter 815, a tone mapping filter 820, a color palette filter 825, a style filter 830, a smoothness filter 835, a Cartoonization filter 840, and a temperature coloring filter 845. The ellipsis 850 demonstrates how other types of filters may be included as well. Each of these different filters will be discussed briefly below. Of course, the use of the filters may be performed on a single pixel or on a group of pixels comprising any number of pixels.

The shading filter 810 is a type of filter that applies shading (e.g., the darkening or other coloring of a pixel) to the image. For instance, the shading filter 810 effectively uses the "AND" operator for the color of a particular pixel with a desired color in order to modify that pixel's color to thereby create the shading effect.

The texture filter 815, which may include bilinear filtering, anisotropic filtering, trilinear filtering, and so on, samples a group of pixels to determine a color. The texture filter 815 also reduces blurring effects and further helps to preserve an object's detail or texture by utilizing the determined color mentioned above.

The tone mapping filter 820 is a mapping technique. Specifically, this filter maps a group of colors to a different group of colors in order to attempt to approximate how a high-dynamic range (HDR) image or other type of image would appear.

The color palette filter 825 provides consistency in the color palettes used from one image to another image. For instance, if one image uses a palette that is different from a desired palette, then the embodiments are able to apply the color palette filter 825 to transform the colors of the original image so that those colors correspond to the desired color palette.

The style filter 830 operates to modify the style (i.e. how the image is displayed) of the image. For instance, the style filter 830 can automatically modify an image by cropping, desaturating, scaling, resizing, or even rotating the image. Different visual effects can also be imposed on the image. For instance, the embodiments are able to modify the style of a visible light image so that the resulting image appears similar to a low light image or even perhaps to a thermal image. Similarly, the style of a low light image may be modified so that the resulting image appears similar to a visible light image or a thermal image. Continuing with the example, the style of a thermal image may be modified so that the resulting image appears similar to a visible light image or a low light image. Of course, the style of an image may be modified to correspond to the style of any other type of image, without limit, by applying the style filter 830.

The smoothness filter 835 may be used to filter or smooth out noise that may be present in an image. In some cases, the smoothness filter 835 utilizes a gaussian filter or any other type of filter to reduce the noise. The effects of applying the smoothness filter 835 is that the resulting image has a less pixelated visualization.

The Cartoonization filter 840 transforms the image so that one, some, or all of the objects and/or environmental features appear in a cartoon-like manner. Stated differently, the Cartoonization filter 840 transforms an image into a sketch, a cartoon, or some other caricature.

Another filter includes a temperature coloring filter 845 that operates based on the temperature of the scene or environment. This is especially true for thermal imagery. For instance, the embodiments are able to colorize the scene based on temperature, or the hottest parts of the scene.

Figure 9:
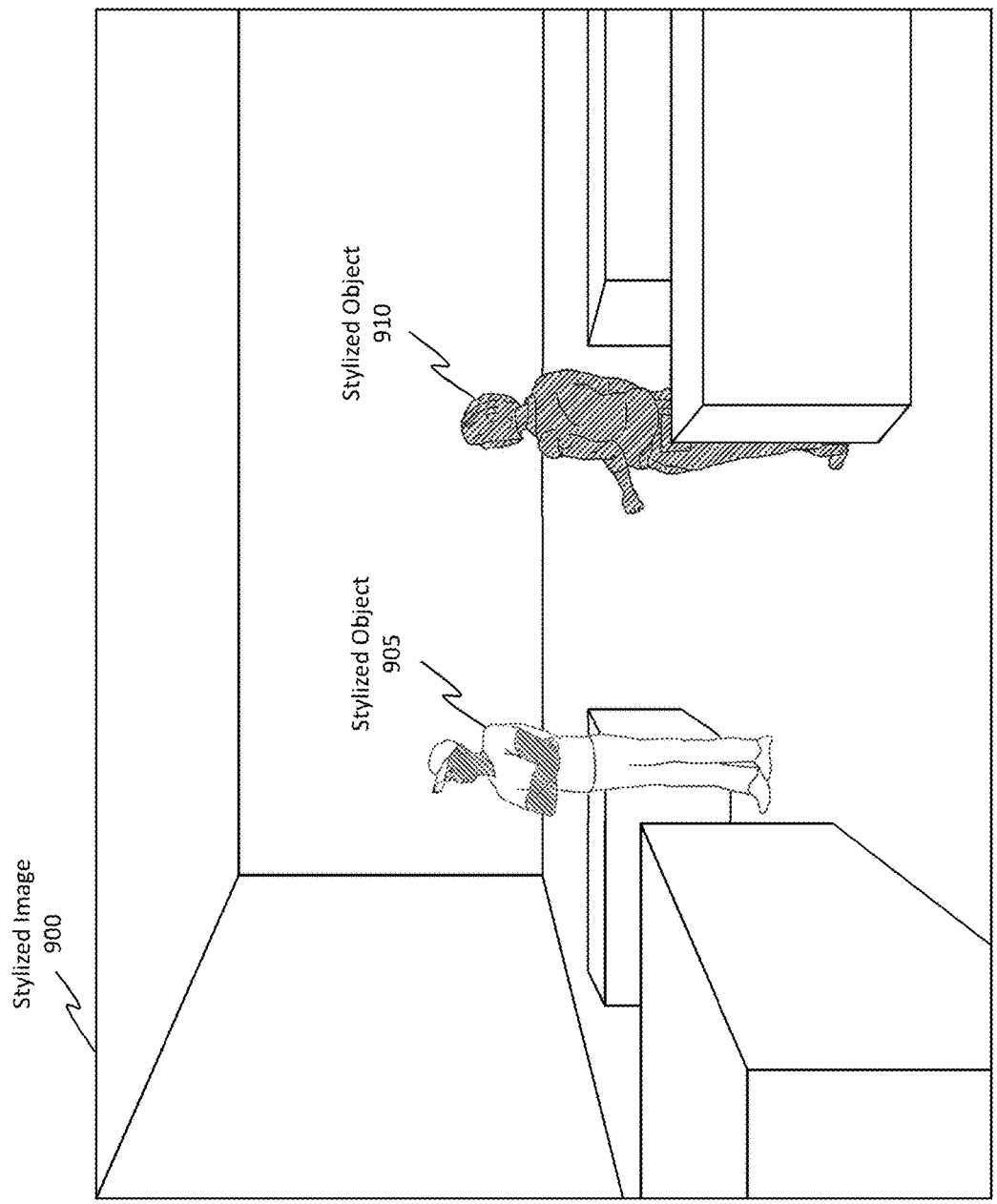
FIG. 9 illustrates an example of a stylized image that is generated in response to applying a stylization filter to the raw texture image.

FIG. 9 illustrates an example of a stylized image 900 that is generated as a result of applying the stylization filters(s) 800 from FIG. 8 to one or more portions of the raw texture image 700 of FIG. 7. In particular, FIG. 9 shows a stylized object 905, which corresponds to the object 710 from FIG. 7, and a stylized object 910, which corresponds to the object 715.

The embodiments are able to selectively stylize one or more portions of an image and are even able to selectively stylize one or more portions of an object. For instance, only a portion of the object 710 from FIG. 7 has been stylized, as shown by the cross shading in FIG. 9 for the stylized object 905. In this case, only the man's skin, but not his clothing or other apparel, has been stylized.

Figure 10B:
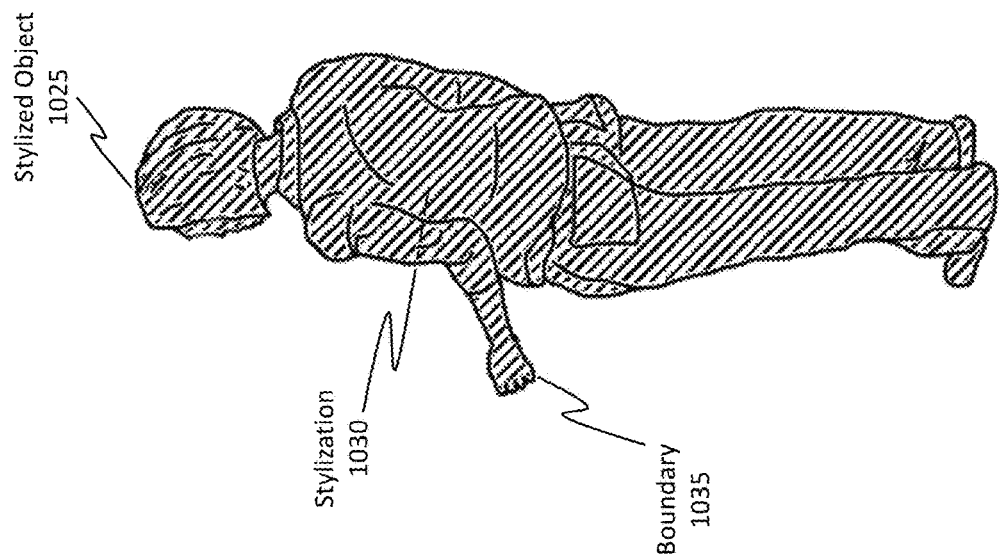
FIGS. 10A, 10B, and 10C illustrate different ways in which stylization can be added to an image.
Figure 10A:
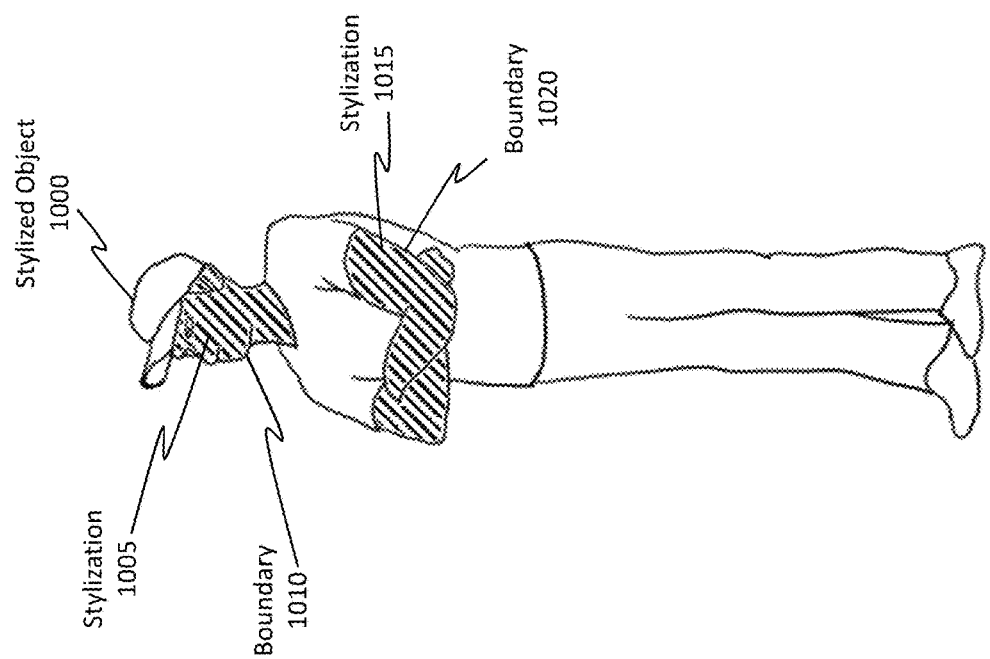
Figure 10C:
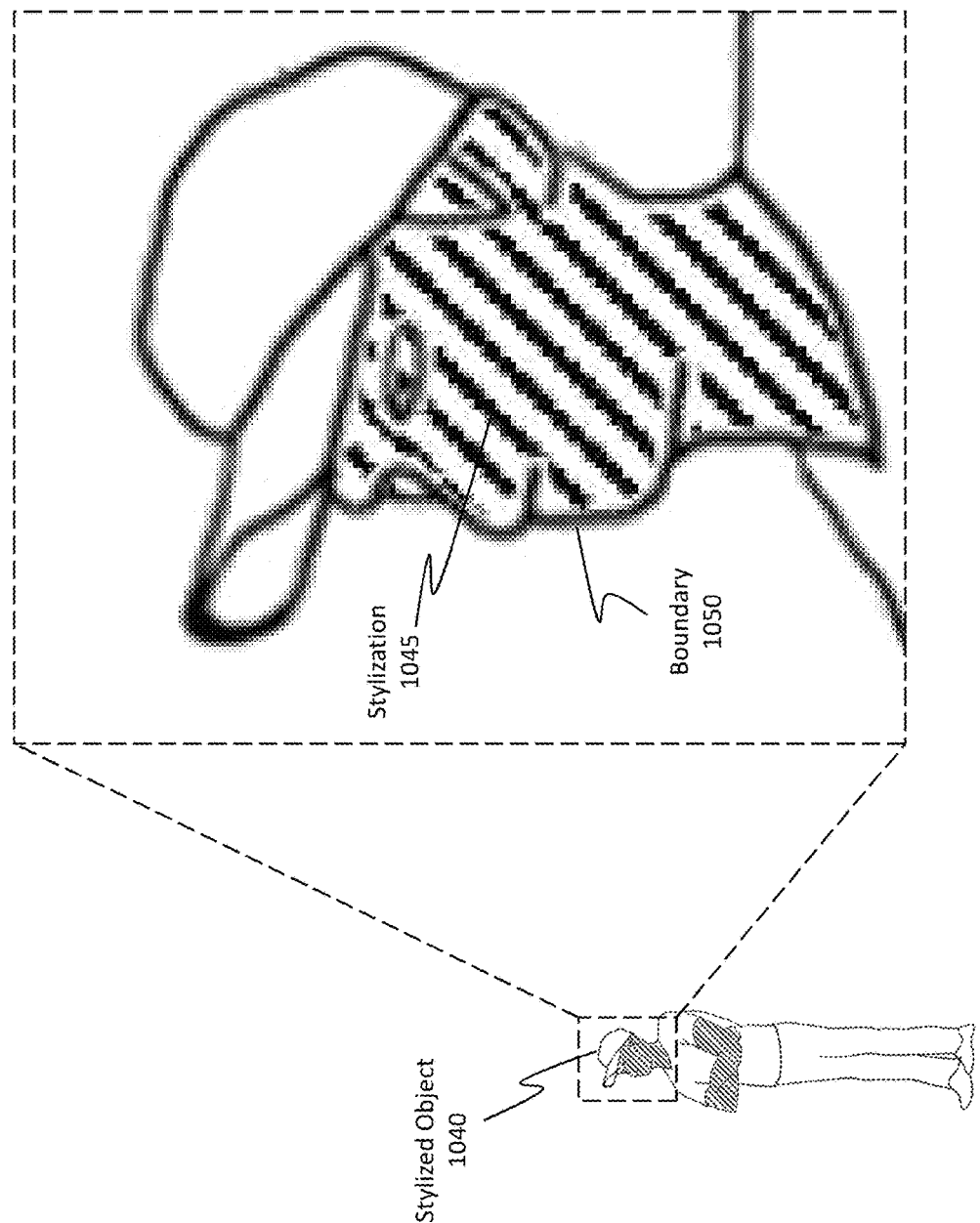

In contrast, the entire object 715 from FIG. 7 has been stylized, as reflected by the entirely cross shaded stylized object 910. In this regard, the embodiments are able to selectively apply the stylization filter(s) 800 from FIG. 8 in any manner, including by selecting specific portions, or the entire portion, of an object to stylize. Of course, the cross shading in FIG. 9 is provided in a symbolic nature to represent how any stylization effect, including those recited in connection with FIG. 8, may be applied to an image in order to generate the stylized image 900. FIGS. 10A, 10B, and 10C provide some additional information regarding the selective stylization process.

FIG. 10A shows a stylized object 1000, which is representative of the stylized object 905 from FIG. 9. Notice, the stylization 1005, which is generated by applying the stylization filter(s) mentioned earlier, is bounded or confined by the boundary 1010. Similarly, the stylization 1015 is bounded, limited, or otherwise confined by the boundary 1020.

In this case, the boundary 1010 and the boundary 1020 correspond to pixels of the stylized object 1000 corresponding to the man's visible skin. The man's apparel, on the other hand, is not stylized. The disclosed embodiments are able to analyze and examine the pixels of a particular object and further refine or segment those pixels into different classifications, or hierarchical leaves in a hierarchy tree node.

For instance, the top level of the tree node may indicate that the pixels of the stylized object 1000 correspond to a human male. That human male is associated with different features, however. For instance, the human male has exposed skin, a cap, a shirt, pants, and shoes. The embodiments are able to analyze the different pixels of the human male and segregate or classify those pixels into different hierarchical nodes or leaves in the hierarchy tree. The embodiments are then able to selectively apply the stylization filter(s) to one or more portions of the object, such as to the man's skin. Of course, other objects may be identified and further classified, without limit (e.g., a chair may have any number of legs, a seat, and a back rest as leaves in a tree structure).

The boundary 1010 and the boundary 1020 may correspond or may define the different parts of the stylized object 1000. For instance, in this case, the boundary 1010 and the boundary 1020 define locations where the male's skin is exposed and thus visible. Based on these boundaries and based on the criteria used to determine which portions are to be stylized (in this case, the man's skin was selected to be stylized), the embodiments are able to confine the stylization to the regions defined by the boundaries, such as boundary 1010 and boundary 1020.

It will be appreciated that the stylization 1005 applied using the boundary 1010 may be different from the stylization 1015 applied using the boundary 1020. For instance, a particular combination of one or more stylization filters may be applied to generate the stylization 1005 while a different combination of one or more stylization filters may be applied to generate the stylization 1015. In this regard, different portions of a particular object may be stylized in different ways.

Regarding the stylized object 1025, stylization 1030 has also been applied and is confined to the regions defined by the boundary 1035. In this case, the boundary 1035 is the outer perimeter of the human female, or rather, the pixels defining the outer regions of the female. Consequently, all of the pixels bounded by the boundary 1035 have been stylized, as shown by the cross shading. The stylization 1030 may also be different than the stylization 1005 and the stylization 1015. In this regard, different portions of the same image (e.g., the stylized object 1000 and the stylized object 1025 are included in the same image, as shown by the stylized image 900 from FIG. 9) may be stylized in different ways or in the same way, without limit.

FIG. 10C shows a stylized object 1040, which is representative of the stylized object 1000 from FIG. 10A. FIG. 10C also shows a blown-up or enhanced view of the stylization 1045, which is representative of the stylization 1005 from FIG. 10A, and the boundary 1050, which is representative of the boundary 1010. Here, again, the figures demonstrate how a boundary may be selected (e.g., boundary 1050) to restrict or confine where stylization will occur. In this case, the boundary 1050 outlines or defines the regions where the human male's skin is exposed. Pixels that are confined by the outer boundary 1050 are stylized.

One will appreciate how any boundary may be defined or selected. For instance, it could have been the case that only the man's nose was to be stylized or only the man's ear was to be stylized. In some cases, the man's neck and a portion of the man's shirt may be stylized based on boundaries defining those regions. In some cases, the entire shirt or only a portion of the shirt is stylized, based on boundaries defining those regions. Indeed, any boundary may be established or defined. In some cases, the defined boundaries may be based on pixel coordinates of an object. In some cases, the defined boundaries may be based on nodes or leaves defined in the tree hierarchy. In some cases, the defined boundaries may be based on other features or criteria, without limit. In some cases, the boundaries may span multiple different objects and/or multiple different features of an object or multiple objects. The shape of the boundary may take any form or any shape, without limit. In some embodiments, selecting where to apply stylization may be dependent on boundaries that are defined.

Accordingly, the embodiments are able to selectively apply stylization to at least a portion of an image. Notably, at least the portion of the raw texture image to which the one or more stylization filters are applied may be an object (or a part of an object) represented in the raw texture image. Furthermore, the stylization that occurs to the object (e.g., by applying the one or more stylization filters) may be bounded by a boundary defined by the object (e.g., either as a whole such as is shown by the boundary 1035 in FIG. 10B or by a smaller boundary such as is shown by the boundary 1010 or 1020 of FIG. 10A). Consequently, the stylization is restricted to areas of the image that are bounded by the boundary, and the stylization is prevented from extending beyond the boundary.

Preventing or restraining the stylization from extending beyond the boundary provides a useful benefit. For instance, the prevention enables the depth map to be complete such that no new three-dimensional (3D) content is added to the depth map as a result of adding the stylization. For instance, applying stylization to the man's skin results in no new 3D content being generated such that the depth map (which is based on the original un-stylized image) is still accurate even relative to the stylized image.

Flowchart for Stylizing Images and Applying Parallax Correction

Figure 11A:
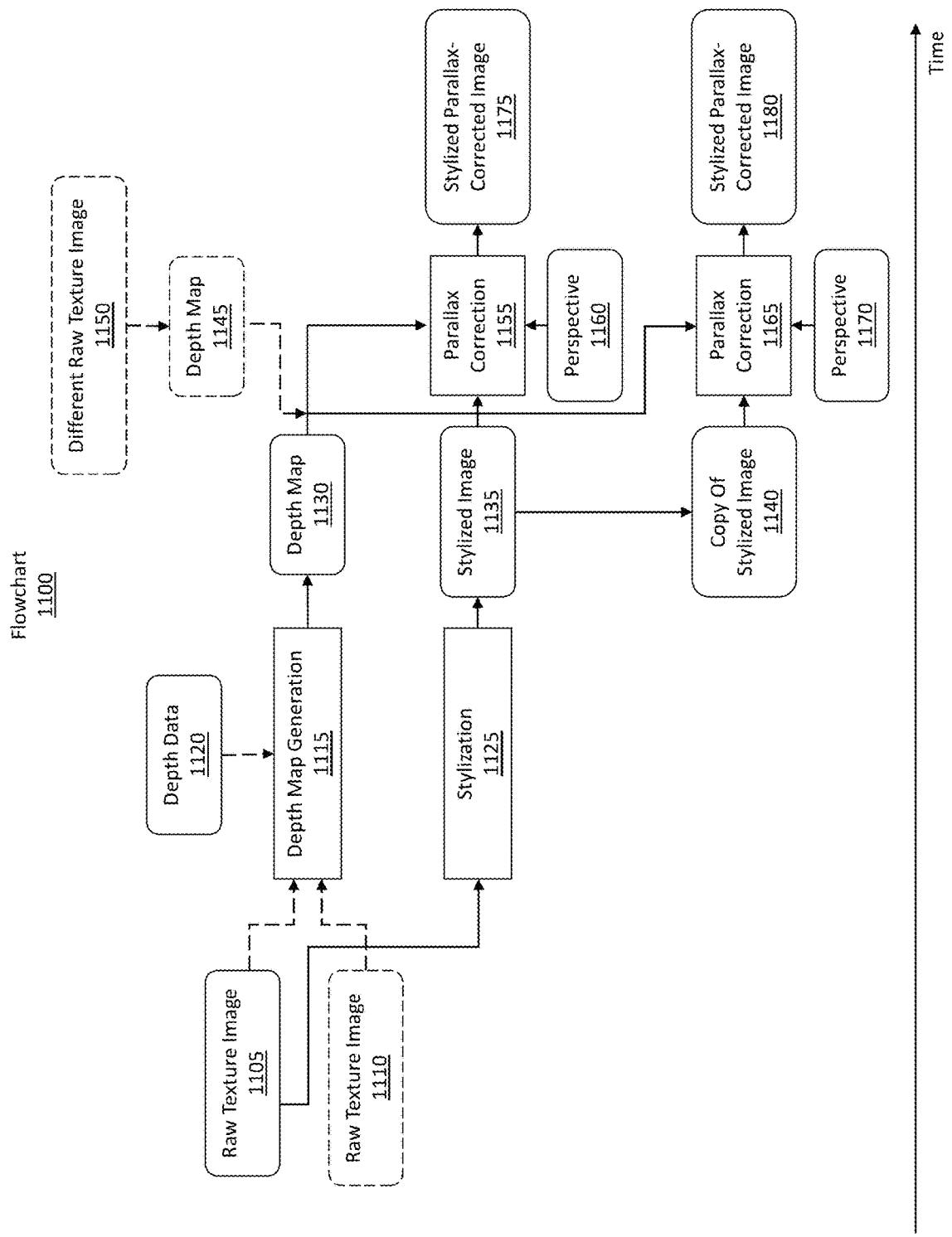

FIG. 11A shows a flowchart 1100 of an example methodology for generating stylized images and then applying parallax correction to those images. The flowchart 1100 is generally arranged along the time axis, as shown in FIG. 11A. Notably, however, no timing requirement is specifically required unless stated.

Initially, a raw texture image 1105 is generated, such as the raw texture image 700 of FIG. 7. In some cases, a second raw texture image 1110 may be generated simultaneously with the raw texture image 1105. For instance, the raw texture image 1105 may be generated by a first camera (e.g., any of the cameras discussed thus far) while the raw texture image 1110 may be generated by a second camera. The raw texture image 1110 is shown using a dotted line to illustrate how this is an optional feature.

There is then a depth map generation 1115 phase performed to generate a depth map, which may be used to perform parallax correction. In some embodiments, the raw texture image 1105 and the raw texture image 1110 are fed as inputs to a stereo matching algorithm in order to perform the depth map generation 1115 process. That is, some embodiments capture a second raw texture image (e.g., raw texture image 1110). The raw texture image 1105 and the second raw texture image 1110 may constitute a stereo pair of images that are generated by a stereo pair of cameras. Furthermore, the process of acquiring or generating a subsequent depth map may be performed by performing stereo depth matching using the stereo pair of images.

In some embodiments, different depth data 1120 is fed as the input for the depth map generation 1115 process. The depth data 1120 may be depth data acquired from a different source, such as from a ToF camera, a range finder, or a different PV camera. The dotted lines leading to the depth map generation 1115 are dotted to illustrate how different techniques may be employed to generate a depth map.

After the raw texture image 1105 is generated, there is a stylization 1125 process performed in order to apply stylization to the raw texture image 1105. As far as timing, the stylization 1125 process may be performed before, simultaneously with, or after the depth map generation 1115 process. In the scenario shown in FIG. 11A, the stylization 1125 process is shown as being performed during an overlapping time period with the depth map generation 1115 process. In any event, the stylization 1125 is required to be performed before any parallax correction is performed, as will be discussed later.

The depth map 1130 is generated as a result of performing the depth map generation 1115 process. Additionally, the stylized image 1135 is generated as a result of performing the stylization 1125 process. The stylized image 1135 is representative of the stylized image 900 from FIG. 9.

In some cases, the embodiments also generate a copy of the stylized image 1135, as shown by copy of stylized image 1140. Further details on this copy will be provided momentarily.

After the stylized image 1135 has been generated, the embodiments then perform parallax correction on the stylized image 1135. To do so, the embodiments may utilize the depth map 1130 or, alternatively, the embodiments may utilize a different depth map 1145. In some cases, the different depth map 1145 may have been generated by a different raw texture image 1150 or a pair of different raw texture images.

Regardless of whichever depth map is used (e.g. depth map 1130 or depth map 1145), the embodiments then perform a parallax correction 1155 operation on the stylized image 1135. That is, the embodiments determine a current perspective embodied by the stylized image 1135 and then reproject the stylized image 1135 so it has a new perspective 1160.

Similarly, the embodiments perform parallax correction 1165 to the copy of stylized image 1140 based on a new perspective 1170. By way of example, the parallax correction 1155 may be performed to reproject the stylized image 1135 to a new perspective 1160 corresponding to a user's left eye. Similarly, the parallax correction 1165 may be performed to reproject the stylized image 1140 to a new perspective 1170 corresponding to a user's right eye.

It should be recognized how the perspectives of the stylized image 1135 and the copy of stylized image 1140 are initially the same because of the copy operation. As such, one of the parallax correction operations (e.g., parallax correction 1155 or 1165) may potentially be more complex than the other if the perspectives 1160 and 1170 are quite different. For instance, if the raw texture image 1105 were generated by a HMD camera positioned near the user's left eye, and the perspective 1160 is the user's left eye perspective, then that parallax correction 1155 process will be less complicated as compared to a scenario in which the perspective 1170 is selected to be the user's right eye perspective. That is, in the case where the perspective 1170 is selected to correspond to the user's right eye perspective, then the amount of reprojection that will be needed will be more than the amount of reprojection needed for the left eye image.

As a result of performing the parallax correction 1155 operation, the stylized parallax-corrected image 1175 is generated. Similarly, as a result of performing the parallax correction 1165 operation, the stylized parallax-corrected image 1180 is generated.

FIG. 11B demonstrates why it is beneficial to generate the copy of stylized image 1140 as opposed to simply stylizing the raw texture image 1110. By applying stylization and then generating a copy of the stylized image, which will subsequently be parallax corrected, the embodiments maintain stereoscopic consistency 1185 and stylization consistency 1190.

In cases where the stylized parallax-corrected images 1175 and 1180 are used as passthrough images on an HMD, it is beneficial to ensure that the depth and stylization are consistent in those two stereo images. Maintaining these consistencies is achieved as a result of using the copy of stylized image 1140 as opposed to stylizing and reprojecting a different stylized image.

Say, for example, the raw texture image 1110 were stylized in addition to the raw texture image 1105. Furthermore, portions of these two images overlap such that they visually illustrate the same content. It may be the case that the stylization applied to one of the images is slightly different from the stylization applied to the other image. When those images are then provided as passthrough images, the user may experience confusion or disorientation as a result of the different stylizations. Accordingly, by utilizing a copy of the image, the embodiments ensure that the stylization is consistent between the different images.

Stated differently, some embodiments capture a second raw texture image (e.g., raw texture image 1110). The raw texture image 1105 and the second raw texture image 1110 constitute a stereo pair of images that are generated by a stereo pair of cameras. Notwithstanding the current or immediate availability of two texture images, these embodiments then apply stylization filters to only the raw texture image 1105 and refrain from applying the stylization filters to the second raw texture image 1110. Furthermore, notwithstanding the current or immediate availability of two texture images and a single stylized image, these embodiments generate a copy of the stylized image and then generate a second stylized parallax-corrected image (e.g., stylized parallax-corrected image 1180) by reprojecting second texture information from the copy of the stylized image to correspond to a second novel perspective using the depth map or the different depth map. Accordingly, as a result of generating the copy of the stylized image and as a result of reprojecting the second texture information from the copy of the stylized image, stereoscopic consistency 1185 and stylization consistency 1190 are maintained between the stylized parallax-corrected image and the second stylized parallax-corrected image.

That said, some embodiments do perform a stylization process on the raw texture image 1110. Subsequently, those embodiments perform parallax correction on that stylized image. As such, the embodiments may include scenarios not involving a copy.

Figure 12:
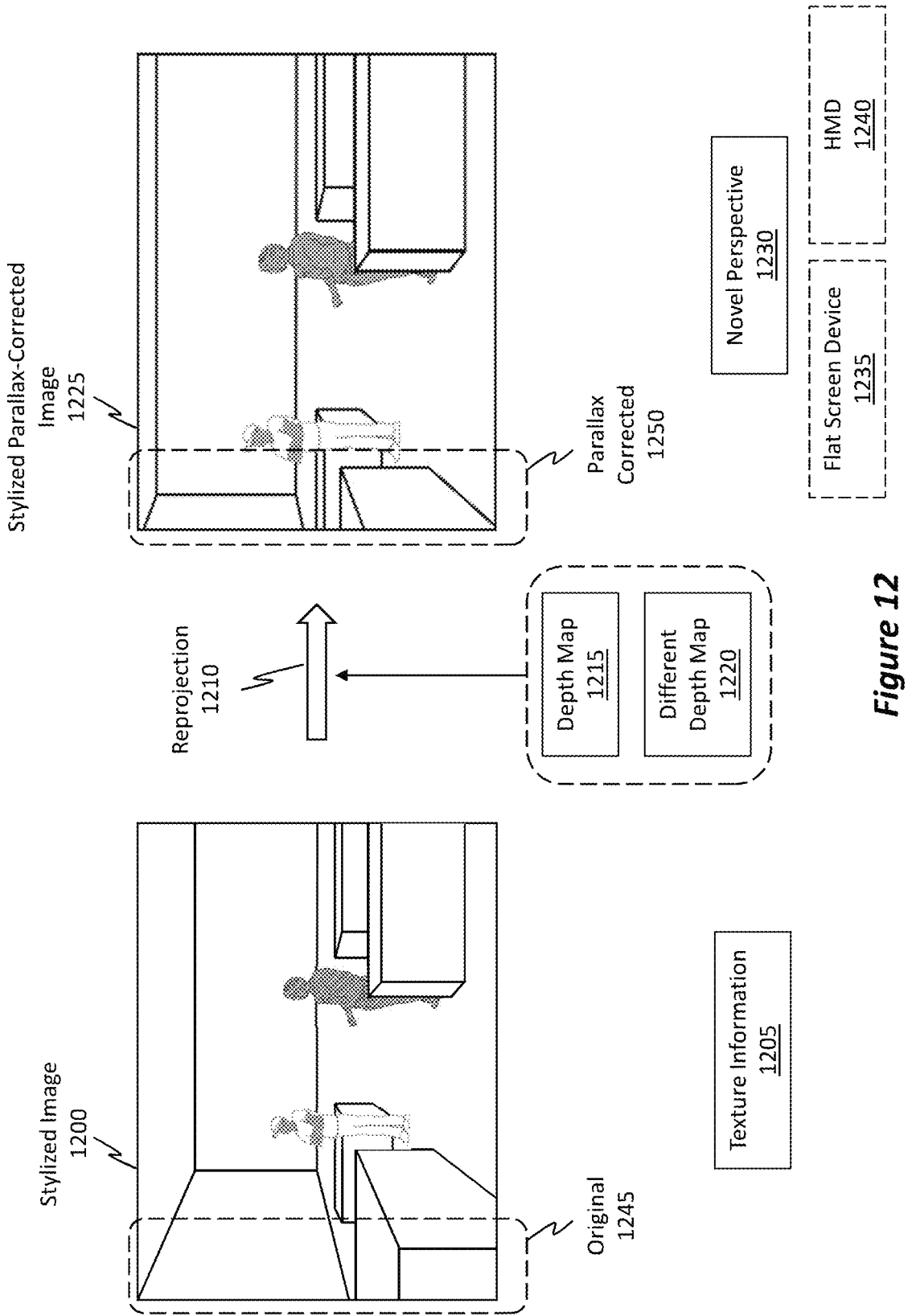
FIG. 12 illustrates some example techniques that may be followed in generating a stylized parallax-corrected image.

FIG. 12 provides some additional details regarding some of the disclosed processes. FIG. 12 shows a stylized image 1200, which is representative of the stylized images discussed thus far. Stylized image 1200 includes texture information 1205, including color and/or intensity information for the different pixels of the stylized image 1200.

In accordance with the disclosed principles, the embodiments perform a reprojection 1210 operation on the stylized image 1200 using either a depth map 1215, such as the depth map 1130 from FIG. 11A or a different depth map 1220, such as the depth map 1145. As a result of performing the reprojection 1210, a stylized parallax-corrected image 1225 is generated (e.g., either one of the stylized parallax-corrected image 1175 or 1180 from FIG. 11A).

The reprojection 1210 operation enabled the stylized parallax-corrected image 1225 to have a novel perspective 1230, which is different from the perspective embodied by the stylized image 1200. In some cases, the novel perspective 1230 is that of a flat screen device 1235 while in other cases it is that of an HMD 1240 or a user's eye who is wearing the HMD 1240.

The novel perspective 1230 is shown by the contrast between the original 1245 section of the left-hand portion of the stylized image 1200 versus the parallax-corrected 1250 section of the left-hand portion of the stylized parallax-corrected image 1225 (of course, other sections of the images may be corrected as well, the left-hand side is simply emphasized for example purposes). The left-hand sections are different as a result of the reprojections performed during the parallax correction in order to ensure the stylized parallax-corrected image 1225 corresponds to the selected novel perspective 1230 (e.g., which may be that of a user's eye or perhaps a different perspective, such as one from a flat screen device).

Example Method(s)

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13:
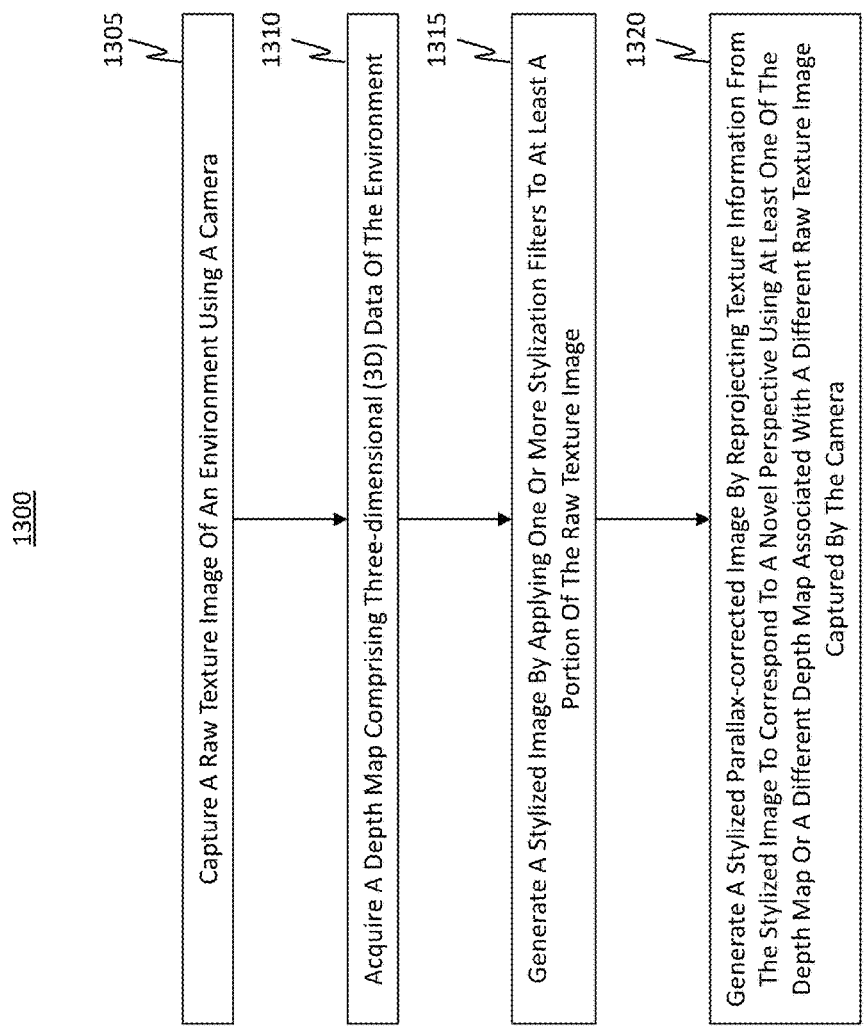
FIG. 13 illustrates a flowchart of an example method for providing a stylized parallax-corrected image.

FIG. 13 shows a flowchart of an example method 1300 for providing stylized parallax-corrected images. Method 1300 may be performed by any type of computer system, including a HMD that has a display.

Initially, method 1300 includes an act (act 1305) of capturing a raw texture image of an environment using a camera. The raw texture image 1105 from FIG. 11A is representative of the raw texture image recited in act 1305.

Method 1300 then includes an act (act 1310) of acquiring a depth map comprising three-dimensional (3D) data of the environment. In some embodiments, the depth map is generated based on pixel disparity data identified between the raw texture image and another raw texture image. For instance, the raw texture image may be a first image of a stereo pair of images, and the process of acquiring the depth map may be performed using a stereo depth matching algorithm (e.g., stereo depth matching algorithm 605 of FIG. 6) on the first image and a second image included in the stereo pair of images. In some embodiments, the depth map is generated based on depth data obtained from another source, such as from a range finder or other depth detection system. In this regard, the depth map may be computed independently of raw texture information included in the raw texture image. Furthermore, it is worthwhile to note that the depth map is generated independently of any stylization effects that are applied to the raw texture image.

In act 1315, a stylized image is generated by applying one or more stylization filters to at least a portion of the raw texture image. For instance, the stylization filter(s) 800 from FIG. 8 may be applied to the raw texture image 1105 from FIG. 11A as a part of the stylization 1125 process. To clarify, the process of applying the one or more stylization filters to at least the portion of the raw texture image includes applying one or more of a shading filter, a texture filter, a tone mapping filter, a color palette filter, a smoothness filter, a temperature coloring filter, and/or a Cartoonization filter. The so-called "portion" of the raw texture image may correspond to a particular object, a group of objects, a sub-portion of an object, or any other part of the image.

Subsequent to acquiring the depth map (which may be based on the original raw texture image) and subsequent to generating the stylized image, method 1300 includes an act (act 1320) of generating a stylized parallax-corrected image (e.g., stylized parallax-corrected image 1225 of FIG. 12 or any of the other stylized parallax-corrected images discussed thus far). Generating the stylized parallax-corrected images is performed by reprojecting (e.g., reprojection 1210 from FIG. 12) texture information (e.g., texture information 1205) from the stylized image (e.g., stylized image 1200) to correspond to a novel perspective (e.g., novel perspective 1230) using at least one of the depth map (e.g., depth map 1215) or a different depth map (e.g., depth map 1220 of FIG. 12 or depth map 1145 of FIG. 11A) associated with a different raw texture image (e.g., different raw texture image 1150) captured by the camera.

Notably, the depth map was used to perform the parallax correction, or reprojection. Furthermore, one should recognize how the depth map was generated independently of any stylization effects. Because no new 3D content was added by the stylization, this depth map is still available to accurately reproject the content of the stylized image.

The stylized parallax-corrected image is now available for display as a real-time passthrough image (e.g., in the context of an HMD) or as an image that may be displayed on a screen or display (e.g., flat screen device 1235). In this regard, the embodiments provide for real-time rendering of stereo passthrough images. For instance, in implementations where an HMD is used, it may be the case that the novel perspective is a perspective of an eye of a user wearing the HMD. In some implementations, the novel perspective may correspond to a flat screen device or other display, and the stylized parallax-corrected image may be displayed on the flat screen device or other display.

Accordingly, the disclosed embodiments are able to enhance how images are generated, stylized, and corrected from parallax. Notably, the stylization occurs prior in time to the parallax correction and relies on a depth map that is potentially generated based on an original or raw texture image as opposed to being based on the stylized image or that is at least generated independently of any stylization effects.

Example Computer/Computer Systems

Figure 14:
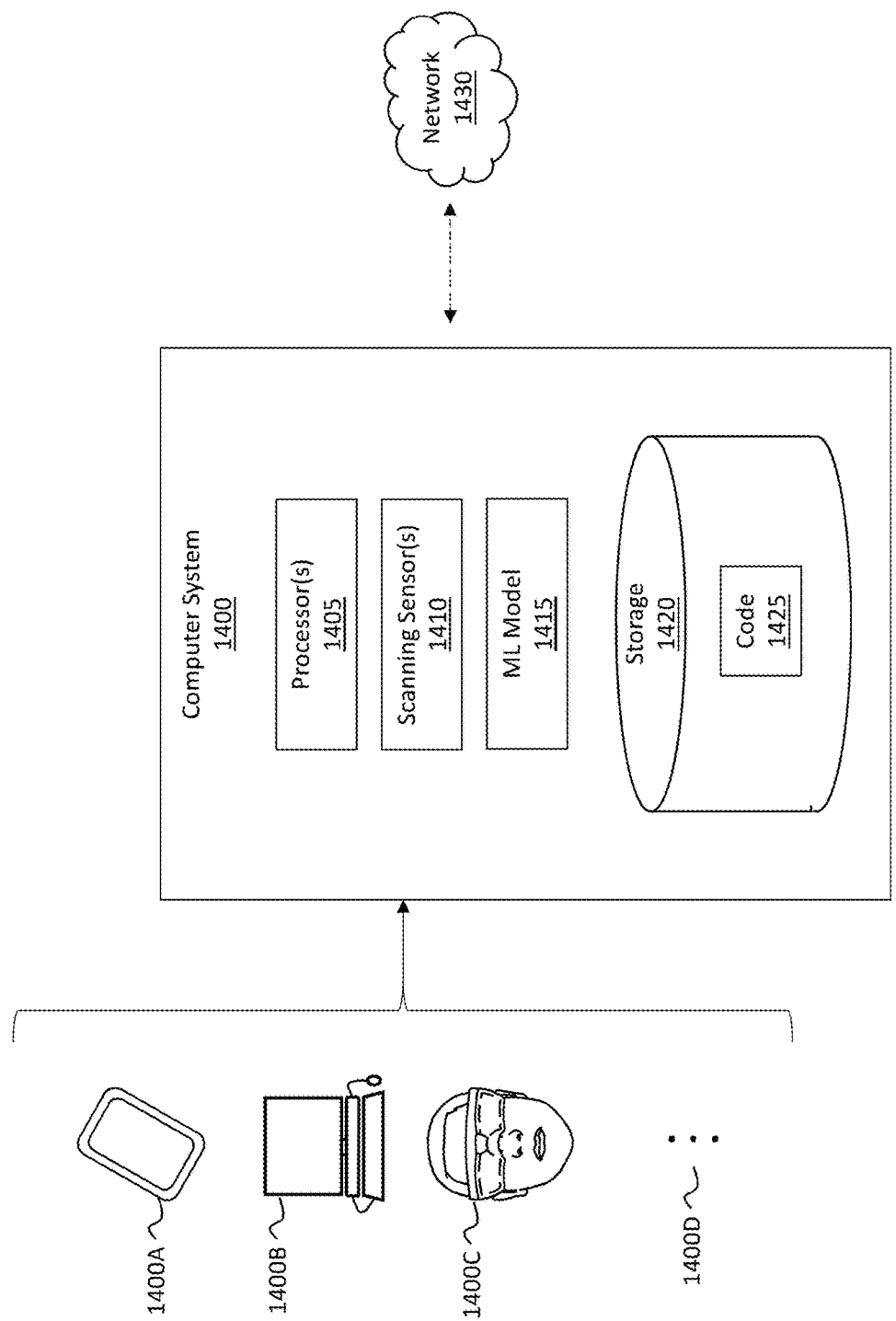
FIG. 14 illustrates an example computer system capable of performing any of the disclosed operations.

Attention will now be directed to FIG. 14 which illustrates an example computer system 1400 that may include and/or be used to perform any of the operations described herein. Computer system 1400 may take various different forms. For example, computer system 1400 may be embodied as a tablet 1400A, a desktop or a laptop 1400B, a wearable device such as an HMD 1400C (which is representative of the HMDs discussed herein), a mobile device, or any other type of standalone device, as represented by the ellipsis 1400D. Computer system 1400 may also be a distributed system that includes one or more connected computing components/devices that are in communication with computer system 1400.

In its most basic configuration, computer system 1400 includes various different components. FIG. 14 shows that computer system 1400 includes one or more processor(s) 1405 (aka a "hardware processing unit"), scanning sensor(s) 1410 (such as those described in FIG. 2), a ML model 1415 (such as that described in the earlier figures), and storage 1420.

Regarding the processor(s) 1405, it will be appreciated that the functionality described herein can be performed, at least in part, by one or more hardware logic components (e.g., the processor(s) 1405). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Any type of depth detection may be performed by the computer system 1400 and by the scanning sensor(s) 1410. Examples include, but are not limited to, stereoscopic depth detection (both active illumination (e.g., using a dot illuminator), structured light illumination (e.g., 1 actual camera, 1 virtual camera, and 1 dot illuminator), and passive (i.e. no illumination)), time of flight depth detection (with a baseline between the laser and the camera, where the field of view of the camera does not perfectly overlap the field of illumination of the laser), range finder depth detection, or any other type of range or depth detection.

The ML model 1415 may be implemented as a specific processing unit (e.g., a dedicated processing unit as described earlier) configured to perform one or more specialized operations for the computer system 1400. As used herein, the terms "executable module," "executable component," "component," "module," "model," or "engine" can refer to hardware processing units or to software objects, routines, or methods that may be executed on computer system 1400. The different components, modules, engines, models, and services described herein may be implemented as objects or processors that execute on computer system 1400 (e.g. as separate threads). The ML model 1415 and/or the processor(s) 1405 can be configured to perform one or more of the disclosed method acts or other functionalities.

Storage 1420 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1420 is shown as including executable instructions (i.e. code 1425). The executable instructions represent instructions that are executable by the processor(s) 1405 (or perhaps even the ML model 1415) of computer system 1400 to perform the disclosed operations, such as those described in the various methods.

The disclosed embodiments may comprise or utilize a special-purpose or general-purpose computer including computer hardware, such as, for example, one or more processors (such as processor(s) 1405) and system memory (such as storage 1420), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1430. For example, computer system 1400 can communicate with any number devices or cloud services to obtain or process data. In some cases, network 1430 may itself be a cloud network. Furthermore, computer system 1400 may also be connected through one or more wired or wireless networks 1430 to remote/separate computer systems(s) that are configured to perform any of the processing described with regard to computer system 1400.

A "network," like network 1430, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1430. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to provide stylized parallax-corrected images, the computer system comprising:
   one or more processors; and
   one or more computer-readable hardware storage devices that store instructions that are executable by the one or more processors to cause the computer system to at least:
      capture a raw texture image of an environment using a camera;
      acquire a depth map comprising three-dimensional (3D) data of the environment;
      generate a stylized image by applying one or more stylization filters to at least a portion of the raw texture image; and
      subsequent to acquiring the depth map and subsequent to generating the stylized image, generate a stylized parallax-corrected image by reprojecting texture information from the stylized image to correspond to a novel perspective using at least one of the depth map or a different depth map associated with a different raw texture image captured by the camera.

2. The computer system of claim 1, wherein the raw texture image is a first image of a stereo pair of images, and wherein acquiring the depth map is performed using a stereo depth matching algorithm on the first image and a second image included in the stereo pair of images.

3. The computer system of claim 1, wherein the computer system is a head-mounted device (HMD), and wherein the novel perspective is a perspective of an eye of a user wearing the HMD.

4. The computer system of claim 1, wherein applying the one or more stylization filters to the at least the portion of the raw texture image includes applying a shading filter.

5. The computer system of claim 1, wherein applying the one or more stylization filters to the at least the portion of the raw texture image includes applying a texture filter.

6. The computer system of claim 1, wherein applying the one or more stylization filters to the at least the portion of the raw texture image includes applying a tone mapping filter.

7. The computer system of claim 1, wherein applying the one or more stylization filters to the at least the portion of the raw texture image includes applying a color palette filter.

8. The computer system of claim 1, wherein applying the one or more stylization filters to the at least the portion of the raw texture image includes applying a style filter.

9. The computer system of claim 1, wherein applying the one or more stylization filters to the at least the portion of the raw texture image includes applying a smoothness filter.

10. The computer system of claim 1, wherein applying the one or more stylization filters to the at least the portion of the raw texture image includes applying a cartoonization filter or, alternatively, applying a temperature coloring filter.

11. A method for providing stylized parallax-corrected images, said method comprising:
   capturing a raw texture image of an environment using a camera;
   acquiring a depth map comprising three-dimensional (3D) data of the environment;

generating a stylized image by applying one or more stylization filters to at least a portion of the raw texture image; and subsequent to acquiring the depth map and subsequent to generating the stylized image, generating a stylized parallax-corrected image by reprojecting texture information from the stylized image to correspond to a novel perspective using at least one of the depth map or a different depth map associated with a different raw texture image captured by the camera.

12. The method of claim 11, wherein the method further includes:

capturing a second raw texture image, the raw texture image and the second raw texture image constituting a stereo pair of images that are generated by a stereo pair of cameras;

wherein acquiring the depth map is performed by performing stereo depth matching using the stereo pair of images.

13. The method of claim 11, wherein applying the one or more stylization filters is performed using a machine learning algorithm.

14. The method of claim 11, wherein the at least portion of the raw texture image to which the one or more stylization filters are applied is an object represented in the raw texture image, and wherein stylization that occurs to the object by applying the one or more stylization filters is bounded by a boundary defined by the object such that the stylization is restricted to areas of the image that are bounded by the boundary and such that the stylization is prevented from extending beyond the boundary.

15. The method of claim 14, wherein preventing the stylization from extending beyond the boundary enables the depth map to be complete such that no new three-dimensional (3D) content is added to the depth map as a result of adding the stylization.

16. The method of claim 11, wherein the novel perspective corresponds to a flat screen device, and wherein the stylized parallax-corrected image is displayed on the flat screen device.

17. The method of claim 11, wherein the method further includes:

capturing a second raw texture image, the raw texture image and the second raw texture image constituting a stereo pair of images that are generated by a stereo pair of cameras;

applying the one or more stylization filters to only the raw texture image and refraining from applying the one or more stylization filters to the second raw texture image;

generating a copy of the stylized image; and generating a second stylized parallax-corrected image by reprojecting second texture information from the copy of the stylized image to correspond to a second novel perspective using the at least one of the depth map or the different depth map.

18. The method of claim 17, wherein, as a result of generating the copy of the stylized image and as a result of reprojecting the second texture information from the copy of the stylized image, stereoscopic consistency and stylization consistency are maintained between the stylized parallax-corrected image and the second stylized parallax-corrected image.

19. A head-mounted device (HMD) comprising:

a display;

one or more processors; and one or more computer-readable hardware storage devices that store instructions that are executable by the one or more processors to cause the HMD to at least:

capture a raw texture image of an environment using a camera;

acquire a depth map comprising three-dimensional (3D) data of the environment;

generate a stylized image by applying one or more stylization filters to at least a portion of the raw texture image; and subsequent to acquiring the depth map and subsequent to generating the stylized image, generate a stylized parallax-corrected image by reprojecting texture information from the stylized image to correspond to a novel perspective using at least one of the depth map or a different depth map associated with a different raw texture image captured by the camera.

20. The HMD of claim 19, wherein the depth map is computed independently of raw texture information included in the raw texture image.

* * * * *